US012753046B2

(12) United States Patent
Roberts

(10) Patent No.: US 12,753,046 B2
(45) Date of Patent: Oct. 6, 2026

(54) AUTONOMOUS ELEVATOR CAR MOVER CONFIGURED WITH GUIDE WHEELS

(71) Applicant: Otis Elevator Company, Farmington, CT (US)

(72) Inventor: Randy Roberts, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1731 days.

(21) Appl. No.: 16/999,239

(22) Filed: Aug. 21, 2020

(65) Prior Publication Data

US 2022/0055865 A1 Feb. 24, 2022

(51) Int. Cl.

| | |
|---|---|
| ***B66B 7/04*** | (2006.01) |
| ***B66B 1/34*** | (2006.01) |
| ***B66B 5/00*** | (2006.01) |
| ***B66B 9/02*** | (2006.01) |
| ***B66B 11/00*** | (2006.01) |
| ***B66B 11/04*** | (2006.01) |

(52) U.S. Cl.

CPC .......... *B66B 11/005* (2013.01); *B66B 1/3446* (2013.01); *B66B 5/0018* (2013.01); *B66B 7/046* (2013.01); *B66B 9/02* (2013.01); *B66B 11/043* (2013.01)

(58) Field of Classification Search

CPC ..... B66B 7/02; B66B 7/021; B66B 7/04–048; B66B 9/02; B66B 11/0035; B66B 11/005; B66B 11/0055; B66B 11/0226; B66B 11/026–04; B66B 11/043

See application file for complete search history.

(56) References Cited

U.S. PATENT DOCUMENTS

| | | | | |
|---|---|---|---|---|
| 5,107,963 | A * | 4/1992 | Rocca | B66B 7/048 267/168 |
| 5,944,144 | A * | 8/1999 | Hein | B66B 9/02 187/254 |
| 9,382,098 | B2 * | 7/2016 | Arai | B66B 7/04 |
| 9,957,134 | B2 * | 5/2018 | Hodge | B66B 7/048 |

(Continued)

FOREIGN PATENT DOCUMENTS

| | | |
|---|---|---|
| CN | 107215752 A | 9/2017 |
| CN | 109466990 A | 3/2019 |
| CN | 111204623 A | 5/2020 |

OTHER PUBLICATIONS

European Search Report for Application No. 21191362.9 issued Jan. 13, 2022.

(Continued)

*Primary Examiner* — Christopher Uhlir

(74) *Attorney, Agent, or Firm* — CANTOR COLBURN LLP

(57) ABSTRACT

Disclosed is a car mover, configured for autonomously moving an elevator car along a track beam in a hoistway lane, having: a car mover body; a drive wheel operationally connected a lateral side of the car mover body, and configured to rotate about a drive wheel axis; a first guide wheel operationally connected to the lateral side of the car mover body, wherein the first guide wheel is offset from the drive wheel so that, in operation: the first guide wheel engages a lateral sidewall of the track beam when the drive wheel laterally moves on the track beam, to thereby restrict lateral motion of the drive wheel on the track beam.

5 Claims, 6 Drawing Sheets

(56) References Cited

U.S. PATENT DOCUMENTS

| | | | | |
|---|---|---|---|---|
| 10,227,210 | B2 * | 3/2019 | Lau | B66B 11/0206 |
| 12,077,415 | B2 * | 9/2024 | Geisshüsler | B66B 7/04 |
| 2003/0102613 | A1 * | 6/2003 | Alves | B66B 11/0273 267/140 |
| 2017/0225924 | A1 | 8/2017 | Lau | |
| 2019/0202665 | A1 | 7/2019 | Lau | |
| 2021/0171319 | A1 * | 6/2021 | Madera | B66B 9/003 |

OTHER PUBLICATIONS

Chinese Office Action; Issued: Jan. 19, 2023; Application No. 202110812881.7; Filed: Jul. 19, 2021; 6 pages.

* cited by examiner

AUTONOMOUS ELEVATOR CAR MOVER CONFIGURED WITH GUIDE WHEELS

BACKGROUND

Embodiments described herein relate to a multi-car elevator system and more specifically to autonomous elevator car movers configured with guide wheels.

An autonomous elevator car mover may use motor-driven wheels to propel the elevator car up and down on vertical track beams, which may be I-beams, having respective webs that form front and back track surfaces. Two elements to this system include the elevator car which will be guided by rollers guides on traditional T-rails, and the autonomous car mover which will house two (2) to four (4) motor-driven wheels. A goal of the connection between the car mover wheels and the track beams includes assuring that the car mover wheels, to the extent possible, remain centered along the tracks.

BRIEF SUMMARY

Disclosed is a car mover, configured for autonomously moving an elevator car along a track beam in a hoistway lane, including: a car mover body; a drive wheel operationally connected a lateral side of the car mover body, and configured to rotate about a drive wheel axis; a first guide wheel operationally connected to the lateral side of the car mover body, wherein the first guide wheel is offset from the drive wheel so that, in operation: the first guide wheel engages a lateral sidewall of the track beam when the drive wheel laterally moves on the track beam, to thereby restrict lateral motion of the drive wheel on the track beam.

In addition to one or more features of the car mover, or as an alternate, the first guide wheel is configured to rotate about a first guide wheel axis that is perpendicular to a drive wheel axis of rotation.

In addition to one or more features of the car mover, or as an alternate, the car mover includes a second guide wheel connected to the lateral side of the car mover body, laterally spaced apart from the first guide wheel, wherein the second guide wheel is configured to rotate about a second guide wheel axis that is parallel to the first guide wheel axis.

In addition to one or more features of the car mover, or as an alternate, the drive wheel has a drive wheel width; and the first and second guide wheels are laterally spaced apart from each other by a guide wheel separation distance that is greater than the drive wheel width, to thereby engage opposing lateral sides of the track beam.

In addition to one or more features of the car mover, or as an alternate the drive wheel has a drive wheel width and a lateral center that is perpendicular to an axis of rotation for the drive wheel; and the first and second guide wheels are laterally spaced apart from each other by a guide wheel separation distance that is less than the drive wheel width, and wherein the first and second guide wheels are positioned on a same lateral side of the lateral center of the drive wheel.

In addition to one or more features of the car mover, or as an alternate, the first and second guide wheels are laterally closer to the car mover body than the lateral center of the drive wheel, to thereby engage opposing lateral sidewalls of a track beam flange that is laterally closer to the car mover body than the lateral center of the drive wheel.

In addition to one or more features of the car mover, or as an alternate, the first and second guide wheels are laterally further from the car mover body than the lateral center of the drive wheel, to thereby engage opposing lateral sidewalls of a track beam flange that is laterally further from the car mover body than the lateral center of the drive wheel.

In addition to one or more features of the car mover, or as an alternate, one or more brackets, including a first bracket having a first bracket end connected to the lateral side of the car mover body, and a bracket body extending away from the first bracket end to a second bracket end, wherein the first and second guide wheels are connected to the car mover body via the one or more brackets, wherein the first guide wheel is connected to the first bracket between the first and second bracket ends.

In addition to one or more features of the car mover, or as an alternate, the car mover includes a sensor is operationally connected to the car mover and configured to sense one or more of: lateral motion of the drive wheel on the track beam; lateral motion of the first guide wheel on the track beam; and a rotation speed of the first guide wheel, wherein responsive to receiving sensor data from the sensor, a car mover controller is configured to determine whether the drive wheel is moving laterally relative to the track beam.

In addition to one or more features of the car mover, or as an alternate, the car mover includes a drive wheel motor is operationally connected to the controller and the drive wheel; and the car mover controller is configured to control one or more of drive and braking motor torque of the drive wheel motor responsive to determining that the drive wheel is moving laterally relative to the track beam.

In addition to one or more features of the car mover, or as an alternate, the car mover includes the sensor is configured to transmit the sensor data to the car mover controller via a wireless or wired communication channel.

In addition to one or more features of the car mover, or as an alternate, the car mover includes the sensor is configured to transmit the sensor data to the car mover controller, utilizing a wireless communication channel, directly or via a cloud system.

In addition to one or more features of the car mover, or as an alternate, the car mover includes the sensor data is configured to be processed, at least in part, on one or more of the sensor via edge computing, the car mover controller and the cloud system.

Further disclosed is an elevator system including: a hoistway lane; a track beam in the hoistway lane; the car mover having one or more features identified above, configured to move along the track beam and thereby move an elevator car along the hoistway lane, wherein the hoistway lane is configured without a guide beam for guiding the elevator car, whereby in operation, guidance of the elevator car in the hoistway lane is exclusively via the car mover.

Further disclosed is an elevator system including: a hoistway lane; a guide beam for guiding an elevator car along the hoistway lane; a track beam in the hoistway lane; the car mover having one or more features identified above, configured to move along the track beam and thereby move an elevator car along the hoistway lane.

Further disclosed is a method of operating a car mover configured for autonomously moving an elevator car along a track beam in a hoistway lane, including: rotating a drive wheel, operationally connected a lateral side of a car mover body, about a drive wheel axis; sensing, with a sensor that is operationally connected to the car mover, one or more of: lateral motion of the drive wheel on the track beam; lateral motion of the first guide wheel on the track beam; and a rotational speed of the first guide wheel; engaging the first guide wheel with the lateral sidewall of the track beam when the drive wheel laterally moves on the track beam, to thereby restrict lateral motion of the drive wheel on the track beam;

and determining, with a car mover controller, whether the drive wheel is moving laterally relative to the track beam from sensor data transmitted from the sensor.

In addition to one or more features of the method, or as an alternate, the method includes controlling, by the car mover controller, one or more of drive and braking motor torque of a drive wheel motor responsive to determining that the drive wheel is moving laterally relative to the track beam.

In addition to one or more features of the method, or as an alternate, the method includes transmitting, by the sensor, the sensor data to the car mover controller via a wireless or wired communication channel.

In addition to one or more features of the method, or as an alternate, the method includes transmitting, by the sensor, the sensor data to the car mover controller, utilizing a wireless communication channel, directly or via a cloud system.

In addition to one or more features of the method, or as an alternate, the method includes processing the sensor data, at least in part, on one or more of the sensor, the car mover controller and the cloud system.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
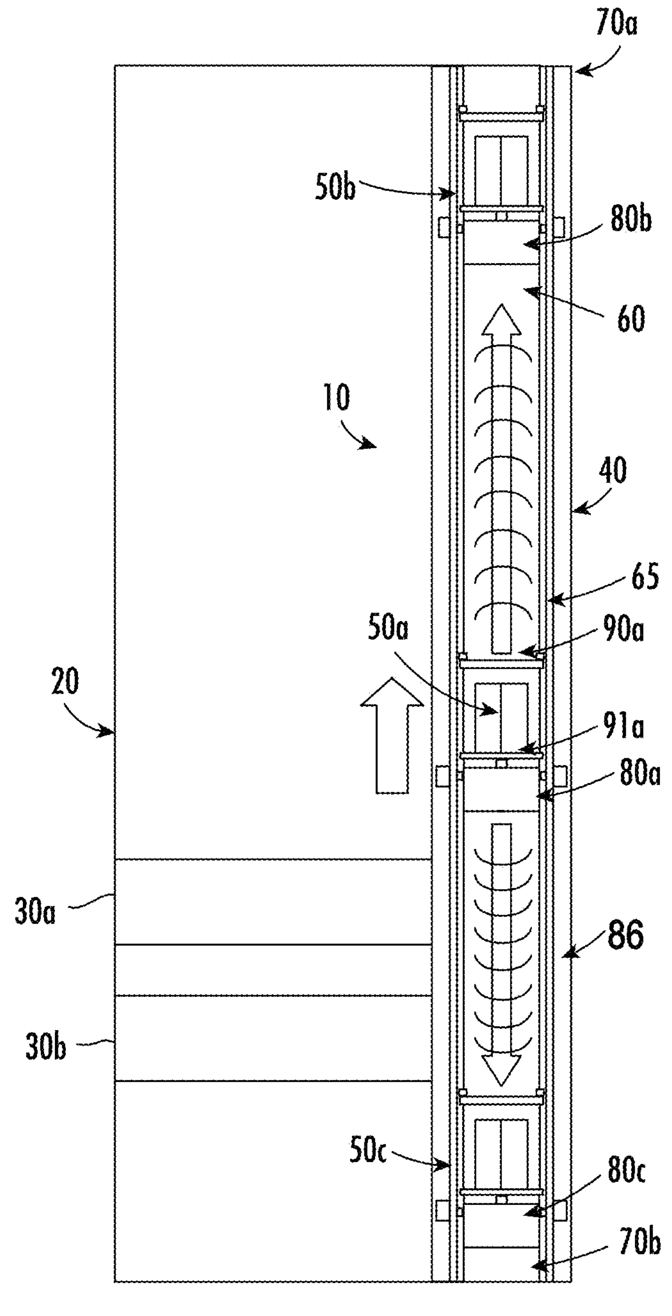
FIG. 1 is a schematic of elevator cars and car movers in a hoistway lane according to an embodiment.

FIG. 1 depicts a self-propelled or ropeless elevator system (elevator system) 10 in an exemplary embodiment that may be used in a structure or building 20 having multiple levels or floors 30*a*, 30*b*. Elevator system 10 includes a hoistway 40 (or elevator shaft) defined by boundaries carried by the building 20, and a plurality of cars 50*a*-50*c* adapted to travel in a hoistway lane 60 along an elevator car track 65 (which may be a T-rail) in any number of travel directions (e.g., up and down). The cars 50*a*-50*c* are generally the same so that reference herein shall be to the elevator car 50*a*. The hoistway 40 may also include a top end terminus 70*a* and a bottom end terminus 70*b*.

For each of the cars 50*a*-50*c*, the elevator system 10 includes one of a plurality of car mover systems (car movers) 80*a*-80*c* (otherwise referred to as a beam climber system, or beam climber, for reasons explained below). The car movers 80*a*-80*c* are generally the same so that reference herein shall be to the car 50*a*. The car mover 80*a* is configured to move along a car mover track 85 (or track surface 85, also referred to in FIG. 2 as track 112) of track beam 86 (also referred to in FIG. 2 as guide beam 111) to move the elevator car 50*a* along the hoistway lane 60, and to operate autonomously. The car mover 80*a* may positioned to engage the top 90*a* of the car 50*a*, the bottom 91*a* of the car 50*a* or both. In FIG. 1, the car mover 80*a* engages the bottom 91*a* of the car 50*a*.

Figure 2:
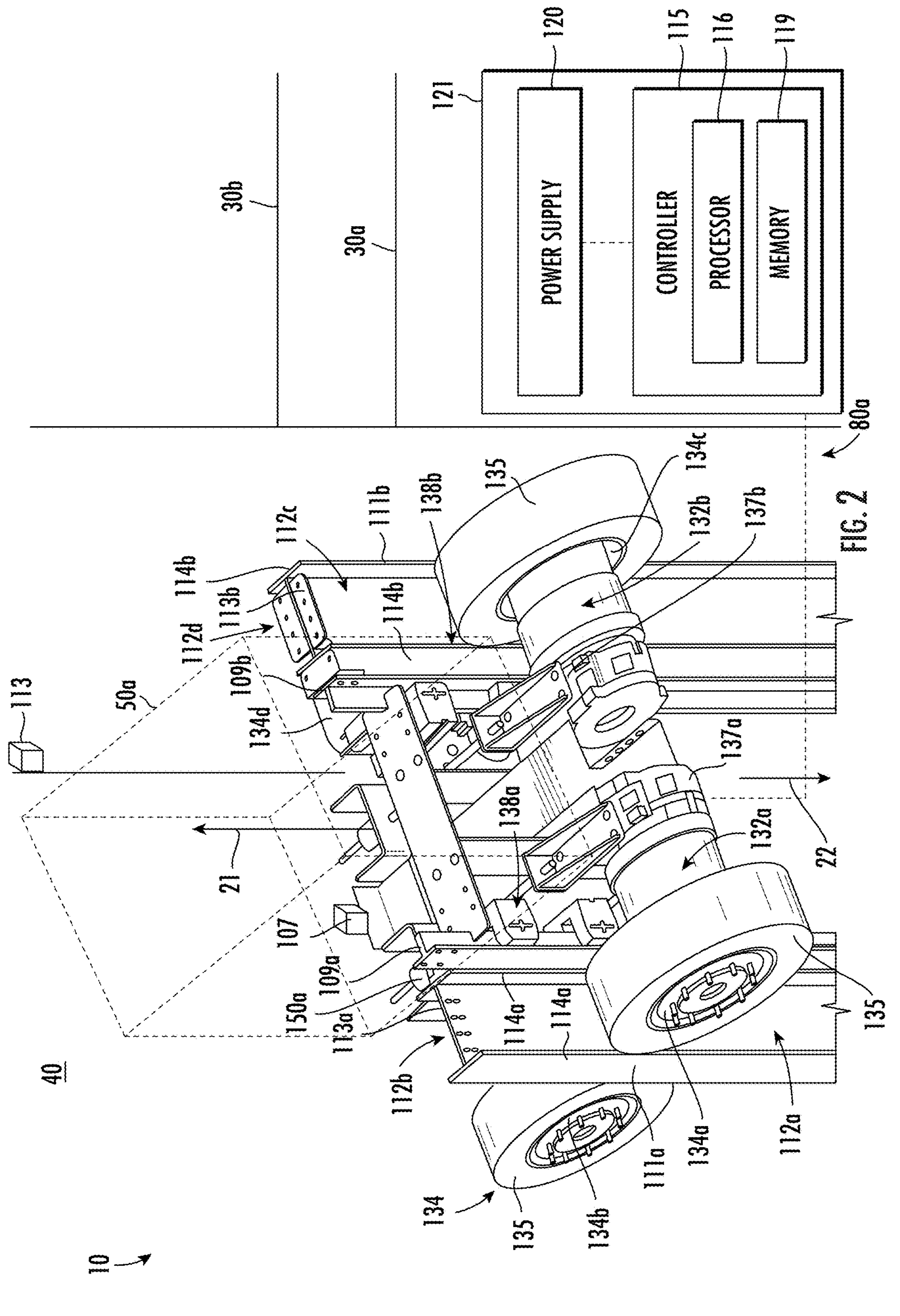
FIG. 2 shows a car mover according to an embodiment.

FIG. 2 is a perspective view of an elevator system 10 including the elevator car 50*a*, a car mover 80*a*, a controller 115, and a power source 120. Although illustrated in FIG. 1 as separate from the car mover 80*a*, the embodiments described herein may be applicable to a controller 115 included in the car mover 80*a* (i.e., moving through an hoistway 40 with the car mover 80*a*) and may also be applicable a controller located off of the car mover 80*a* (i.e., remotely connected to the car mover 80*a* and stationary relative to the car mover 80*a*).

Although illustrated in FIG. 1 as separate from the car mover 80*a*, the embodiments described herein may be applicable to a power source 120 included in the car mover 80*a* (i.e., moving through the hoistway 40 with the car mover 80*a*) and may also be applicable to a power source located off of the car mover 80*a* (i.e., remotely connected to the car mover 80*a* and stationary relative to the car mover 80*a*).

The car mover 80*a* is configured to move the elevator car 50*a* within the hoistway 40 and along guide rails 109*a*, 109*b* that extend vertically through the hoistway 40. In an embodiment, the guide rails 109*a*, 109*b* are T-beams. The car mover 80*a* includes one or more electric motors 132*a*, 132*b*. The electric motors 132*a*, 132*b* are configured to move the car mover 80*a* within the hoistway 40 by rotating one or more motorized wheels 134*a*, 134*b* that are pressed against a guide beam 111*a*, 111*b*, generally referred to as guide beam 111. In an embodiment, the guide beams 111*a*, 111*b* are I-beams. It is understood that while an I-beam is illustrated any beam or similar structure may be utilized with the embodiment described herein. Friction between the wheels 134*a*, 134*b*, 134*c*, 134*d* driven by the electric motors 132*a*, 132*b* allows the wheels 134*a*, 134*b*, 134*c*, 134*d* climb up 21 and down 22 the guide beams 111*a*, 111*b*. The guide beam extends vertically through the hoistway 40. It is understood that while two guide beams 111*a*, 111*b* are illustrated, the embodiments disclosed herein may be utilized with one or more guide beams. It is also understood that while two electric motors 132*a*, 132*b* are illustrated, the embodiments disclosed herein may be applicable to car movers 80*a* having one or more electric motors. For example, the car mover 80*a* may have one electric motor for each of the four wheels 134*a*, 134*b*, 134*c*, 134*d* (generically wheels 134). The electrical motors 132*a*, 132*b* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 50*a*).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*, generally referred to as track surfaces 112. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto the web portion 113*a* of the first guide beam 111*a*.

The first compression mechanism 150*a* may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method.

The first compression mechanism 150*a* may be adjustable in real-time during operation of the elevator system 10 to control compression of the first wheel 134*a* and the second wheel 134*b* on the first guide beam 111*a*. The first wheel 134*a* and the second wheel 134*b* may each include a tire 135 to increase traction with the first guide beam 111*a*.

The first surface 112*a* and the second surface 112*b* extend vertically through the hoistway 40, thus creating a track surface for the first wheel 134*a* and the second wheel 134*b* to ride on. The flange portions 114*a* may work as guardrails to help guide the wheels 134*a*, 134*b* along this track surface and thus help prevent the wheels 134*a*, 134*b* from running off track surface.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*.

The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 50*a*.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*.

The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 10 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track surface for the third wheel 134*c* and the fourth wheel 134*d* to ride on. The flange portions 114*b* may work as guardrails to help guide the wheels 134*c*, 134*d* along this track surface and thus help prevent the wheels 134*c*, 134*d* from running off track surface.

The second electric motor 132*b* is configured to rotate the third wheel 134*c* to climb up 21 or down 22 the second guide beam 111*b*. The second electric motor 132*b* may also include a second motor brake 137*b* to slow and stop rotation of the second motor 132*b*. The second motor brake 137*b* may be mechanically connected to the second motor 132*b*. The second motor brake 137*b* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109*a* proximate the elevator car 50*a*.

The elevator system 10 may also include a position reference system 113. The position reference system 113 may be mounted on a fixed part at the top of the hoistway 40, such as on a support or guide rail 109, and may be configured to provide position signals related to a position of the elevator car 50*a* within the hoistway 40. In other embodiments, the position reference system 113 may be directly mounted to a moving component of the elevator system (e.g., the elevator car 50*a* or the car mover 80*a*), or may be located in other positions and/or configurations.

The position reference system 113 can be any device or mechanism for monitoring a position of an elevator car within the elevator shaft 117. For example, without limitation, the position reference system 113 can be an encoder, sensor, accelerometer, altimeter, pressure sensor, range finder, or other system and can include velocity sensing, absolute position sensing, etc., as will be appreciated by those of skill in the art.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 50*a* and the car mover 80*a*. For example, the controller 115 may provide drive signals to the car mover 80*a* to control the acceleration, deceleration, leveling, stopping, etc. of the elevator car 50*a*.

The controller 115 may also be configured to receive position signals from the position reference system 113 or any other desired position reference device.

When moving up 21 or down 22 within the hoistway 40 along the guide rails 109*a*, 109*b*, the elevator car 50*a* may stop at one or more floors 30*a*, 30*b* as controlled by the controller 115. In one embodiment, the controller 115 may be located remotely or in the cloud. In another embodiment, the controller 115 may be located on the car mover 80*a*

The power supply 120 for the elevator system 10 may be any power source, including a power grid and/or battery power which, in combination with other components, is supplied to the car mover 80*a*. In one embodiment, power source 120 may be located on the car mover 80*a*. In an embodiment, the power supply 120 is a battery that is included in the car mover 80*a*. The elevator system 10 may also include an accelerometer 107 attached to the elevator car 50*a* or the car mover 80*a*. The accelerometer 107 is configured to detect an acceleration and/or a speed of the elevator car 50*a* and the car mover 80*a*.

Figure 3:
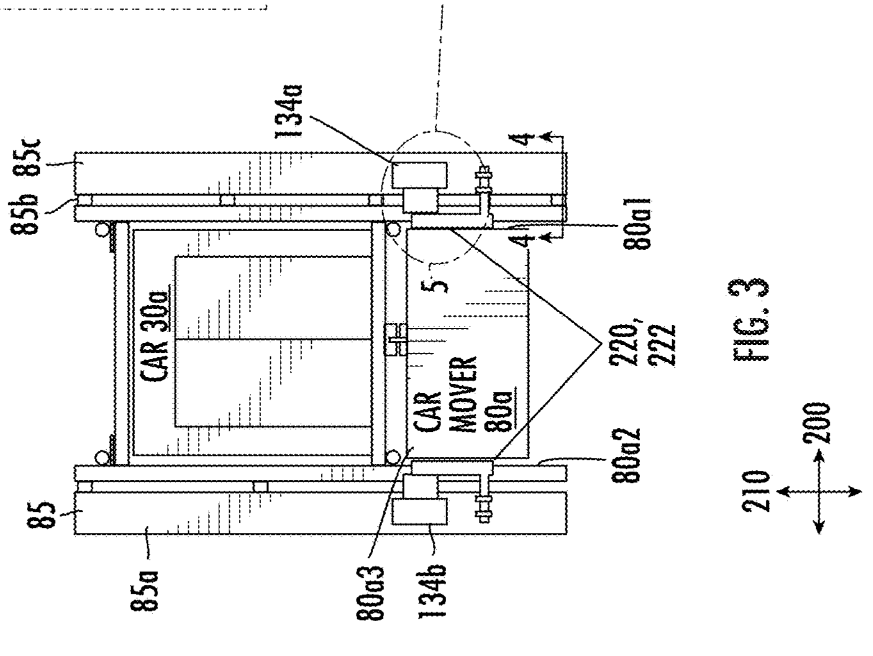
FIG. 3 shows a car mover with a drive wheel and a bracket holding guide wheels according to an embodiment.
Figure 4:
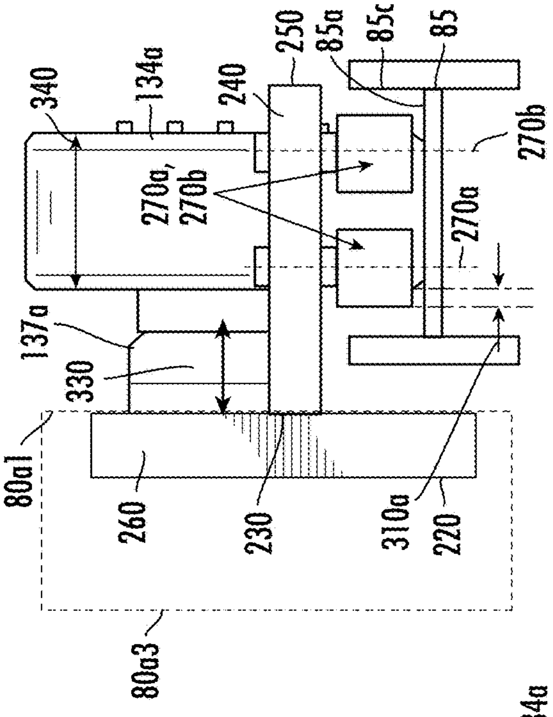
FIG. 4 shows a cross section of the drive wheel, drive wheel motor and bracket holding guide wheels along section lines 4-4 in FIG. 3 according to an embodiment.
Figure 5:
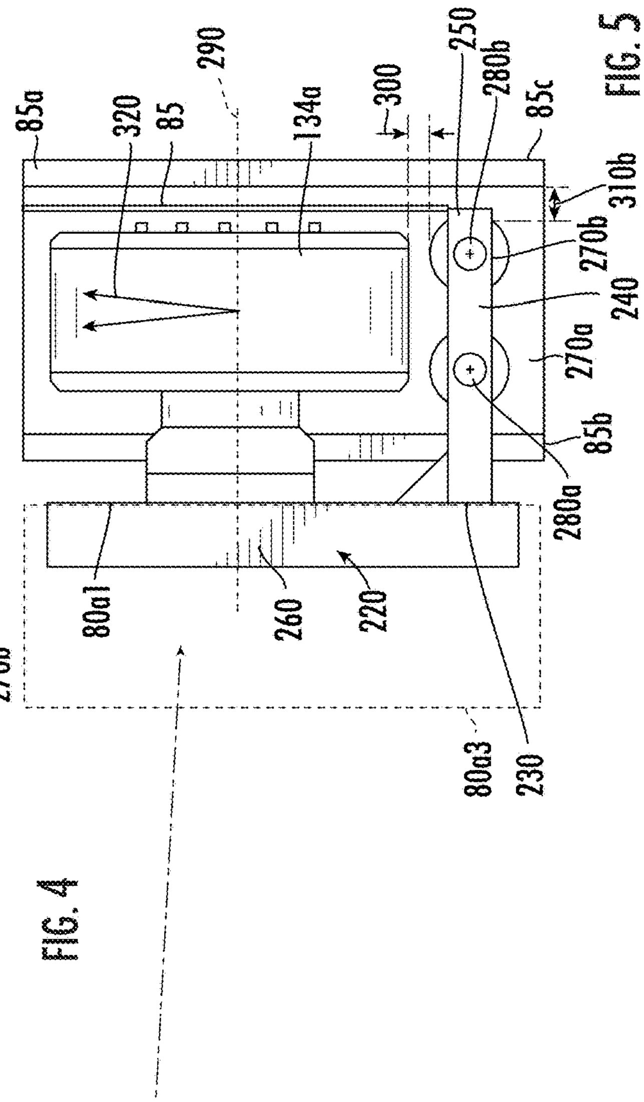
FIG. 5 shows a close-up of the drive wheel, drive wheel motor, and bracket holding guide wheels within section 5 of FIG. 3 according to an embodiment.

Turning to FIG. 3-5, as indicated, the car mover 80*a* for the elevator system 10 is a self-propelled autonomous vehicle that uses multiple wheel hub motors, e.g., motor 137*a*, without a counterweight, to propel an elevator car 50*a* (FIG. 1) in a hoistway 40 (FIG. 1). The drive wheels 134 are arranged as pinched motorized wheel pairs (FIG. 2) that run up and down along the track surface 85*a* of the track beam 86. The track beam 86 is illustrated as an I-beam which includes a web forming the track surface 85*a* and lateral sidewalls 85*b*, 85*c* formed by respective flanges. The lateral sidewalls 85*b*, 85*c* are spaced apart along a lateral axis 200 and which extend along, or parallel to, a longitudinal axis 210, which is the running direction for the car mover 80*a*. The car mover 80*a* may be controlled to steer along the track beam 86 at high speeds. In addition, during on-board braking events, with brakes on the wheels 134*a*, 134*b*, there may be torque imbalances that may impact a direction of travel for the wheels 134*a*, 134*b*.

According to the disclosed embodiments, brackets 220, 222 are respectively provided on each lateral side 80*a*1, 80*a*2 of a car mover body 80*a*3 of the car mover 80*a*. For simplicity, bracket 220 on lateral side 80*a*1 will be discussed further here. The bracket 220 has a first bracket end 230 connected to a lateral side 80*a*1 of a car mover body 80*a*3 of the car mover 80*a* and a bracket body 240 extending laterally away from the first bracket end 230 to a second bracket end 250. The bracket 220 may also have a longitudinal portion 260 connecting the bracket body 240, via the first bracket end 230, to the car mover 80*a*.

First and second guide wheels 270*a*, 270*b* (also referred to as backup rollers) are attached to the bracket 220 between the first and second bracket ends 230, 250. The guide wheels 270*a*, 270*b* rotate about respective guide wheel axes 280*a*, 280*b* which are parallel to each other and perpendicular to the drive wheel axis 290. This way, the guide wheels 270*a*, 270*b* roll against the lateral sidewalls 85*b*, 85*c* of the track beam 86 while the drive wheel 134*a* rolls against the track surface 85*a* of the track beam 86. It is to be appreciated that mounting of the guide wheels 270*a*, 270*b* to the car mover 80*a* may be obtained via other ways than the disclosed brackets 220, 222. Thus, the discussion of the brackets 220, 222 is not intended on limiting the scope of the disclosure.

The guide wheels 270*a*, 270*b* are configured with a small predetermined longitudinal (running) clearance 300 with the drive wheel 134*a*. The guide wheels 270*a*, 270*b* are configured to have respective a lateral gaps 310*a*, 310*b* (otherwise referred to as first and second lateral gaps 310*a*, 310*b*) with the lateral sidewalls 85*b*, 85*c* of the track beam 86, when the drive wheel 134*a* is laterally centered on the track beam 86. The lateral gaps 310*a*, 310*b* may be the same size as each other when the drive wheel 134*a* is in the lateral center of the track beam 86. For simplicity, the lateral gap 310*a* rather than both lateral gaps 310*a*, 310*b* may be referenced herein. The guide wheels 270*a*, 270*b* are configured to engage the of the track beam 86 before the drive wheel 134*a* contacts and scrapes against the lateral sidewalls 85*b*, 85*c*. This limits any steering angle 320 that could result in offset motion 330 during both normal controlled motions and braking events.

It is to be appreciated that with the utilization of the guide wheels 270*a*, 270*b*, in one embodiment the guide rails 109*a*, 109*b* (FIG. 3) are eliminated. Instead the guide wheels 270*a*, 270*b* on the track beams 86 provide for sufficient guidance. Thus, in operation, guidance of the elevator car 50*a* in the hoistway lane 60 in this embodiment is exclusively via the car mover 80*a*.

In the embodiment shown in FIGS. 4 and 5, the guide wheels 270*a*, 270*b* are between track beam flanges formed by the respective sidewalls 85*b*, 85*c* with an I-beam track. For example, the drive wheel 134*a* is larger than the guide wheels 270*a*, 270*b*. The guide wheels 270*a*, 270*b* are spaced from each other by a distance that least partially overlaps a width 340 i.e., a lateral span, of the drive wheel 134*a*. This configuration places the guide wheels 270*a*, 270*b* between the lateral sidewalls 85*b*, 85*c* of the track beam 86, and spaced from the respective sidewalls by the lateral gaps 310*a*, 310*b*.

Figure 6:
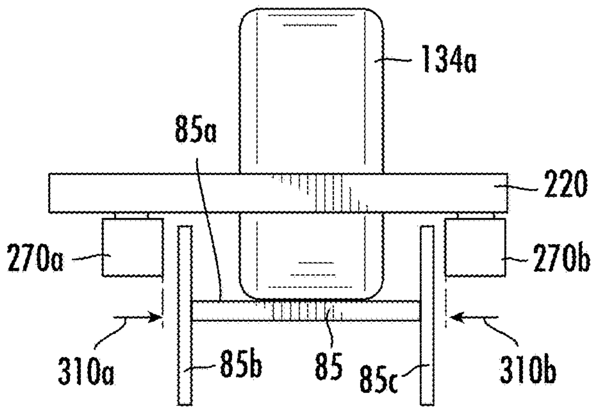
FIG. 6 shows a cross section of the drive wheel and bracket holding guide wheels according to an embodiment, where the track beam is an I-beam and the guide wheels are outside both sidewalls of the track beam.
Figure 7:
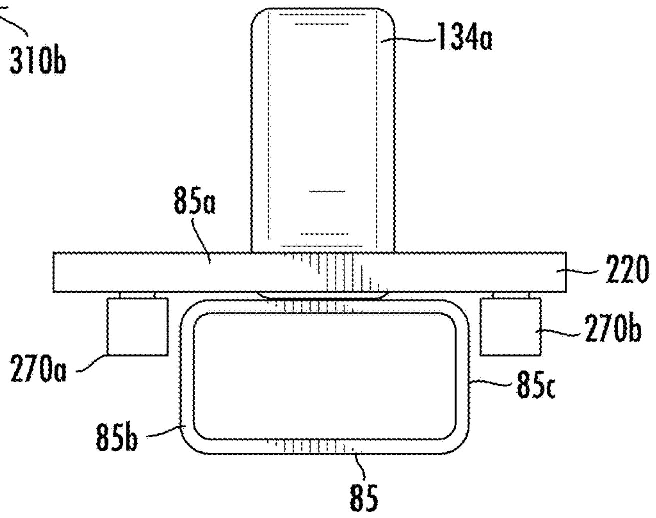
FIG. 7 shows a cross section of the drive wheel and bracket holding guide wheels according to an embodiment, where the track beam is a square beam and the guide wheels are outside both sidewalls of the track beam.

Turning to FIGS. 6-9, other embodiments are shown which include the guide wheels 270*a*, 270*b* supported by the bracket 220 to guide motion of the drive wheel 134*a* along the track surface 85*a* of the track beam 86. As shown in FIG. 6-7, the track surface 85*a* is formed of web of a track beam 86 that is an I-beam having opposing flanges formed by the sidewalls 85*b*, 85*c*. In FIG. 6, the guide wheels 270*a*, 270*b* are spaced by a distance that is greater than the width of the track beam 86, so that the guide wheels are laterally outside of both sidewalls 85*b*, 85*c*. The lateral gaps 310*a*, 310*b* are between the guide wheels 270*a*, 270*b* and the lateral outside of the respective sidewalls 85*b*, 85*c*. It is to be appreciated that in some embodiments, there may be no gaps 310*a*, 310*b* between the guide wheels 270*a*, 270*b* and the lateral outside of the respective sidewalls 85*b*, 85*c*. A similar configuration is shown in FIG. 7, except that track beam 86 that forms the track surface 85*a* has a rectangular cross section. Angulation or lateral travel of the drive wheel 134*a* is prevented by the guide wheels 270*a*, 270*b* engaging the lateral outside of the respective sidewalls 85*b*, 85*c*.

Figure 8:
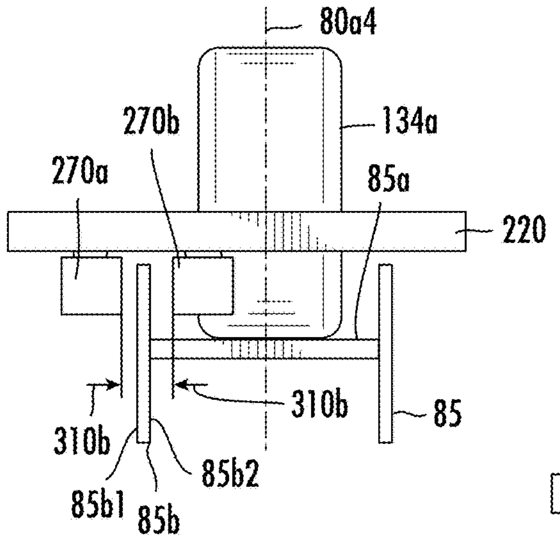
FIG. 8 shows a cross section of the drive wheel and bracket holding guide wheels according to an embodiment, where the track beam is an I-beam and the guide wheels are adjacent opposing surfaces of one sidewall of the track beam.
Figure 9:
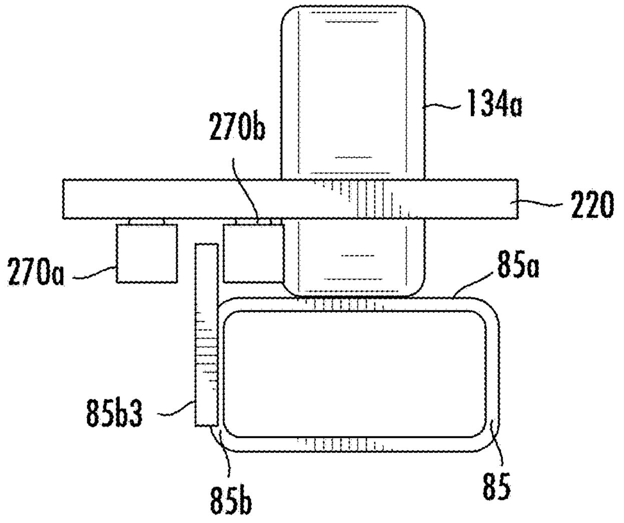
FIG. 9 shows a cross section of the drive wheel and bracket holding guide wheels according to an embodiment, where the track beam is a square beam with a secondary flange and the guide wheels are adjacent opposing surfaces of the secondary flange.

As shown in FIG. 8, the guide wheels 270*a*, 270*b* are against opposing lateral surfaces 85*b*1, 85*b*2 of one of the sidewalls 85*b*, i.e., one of the flange of the track beam 86. That is, the guide wheels 270*a*, 270*b* are between the car mover lateral side 80*a*1 (FIG. 4) and the drive wheel lateral center 80*a*4, also referred to as the widthwise center axis of the drive wheel 134*a*. Thus the lateral gaps 310*a*, 310*b* are located between the guide wheels 270*a*, 270*b* and the opposing side surfaces 85*b*1, 85*b*2 of the one of the sidewalls 85*b* of the track beam 86. It is to be appreciated that in some embodiments, there may be no gaps 310*a*, 310*b* between the guide wheels 270*a*, 270*b* and the opposing side surfaces 85*b*1, 85*b*2 of the one of the sidewalls 85*b* of the track beam 86. A similar configuration is shown in FIG. 9, except that track beam 86 that forms the track surface 85*a* has a rectangular cross section, and a secondary lateral sidewall 85*b*3 is formed by a flange connected to the lateral sidewall 85*b* of the track beam 86, which is engaged by the guide wheels 270*a*, 270*b*. Angulation or lateral travel of the drive wheel 134*a* is prevented by the guide wheels 270*a*, 270*b* engaging the either side of the secondary lateral sidewall.

Figure 10:
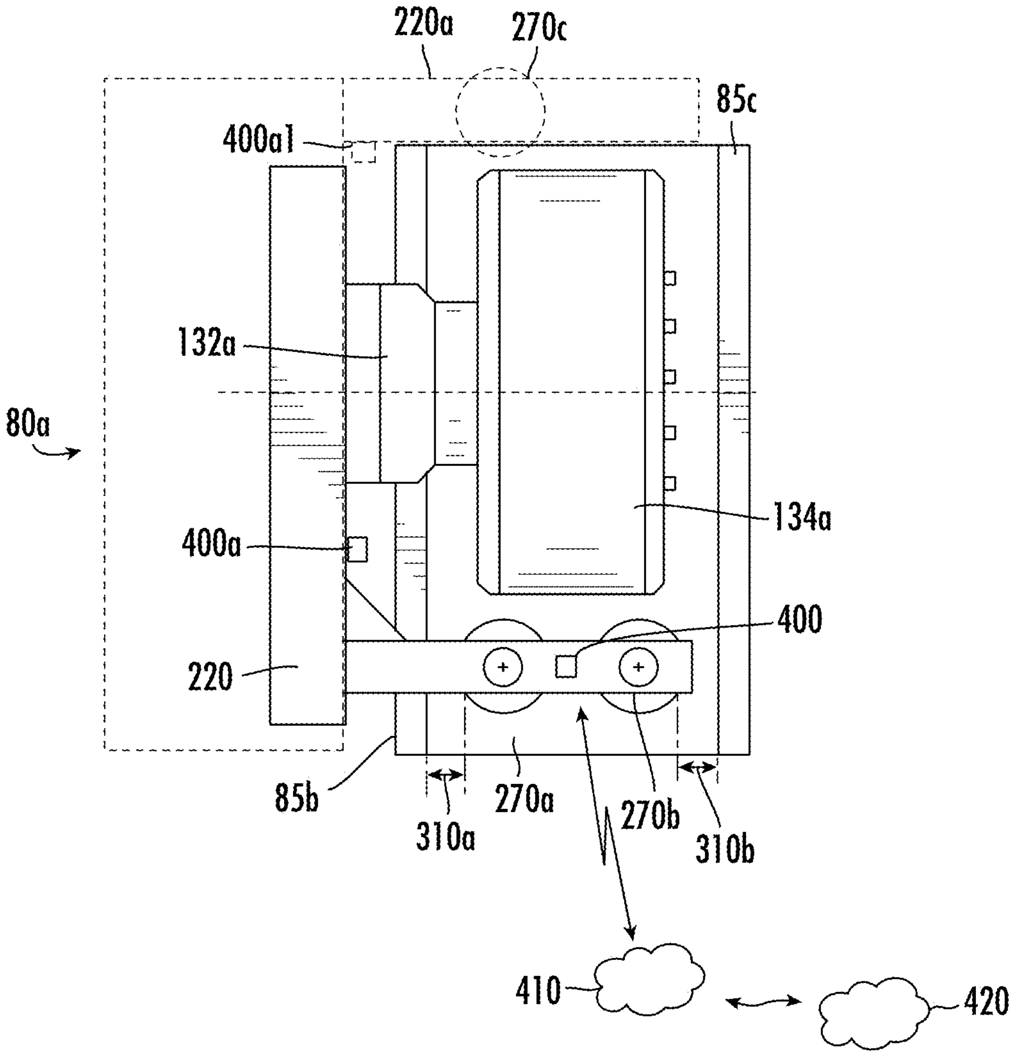
FIG. 10 shows a close-up of the drive wheel, drive wheel motor, and bracket holding guide wheels according to an embodiment, where a sensor is attached to the bracket.

With reference to FIG. 10, in one embodiment, a sensor 400 may be operationally provided, e.g., secured to the bracket 220 or the guide wheels 270*a*, 270*b*. The sensor 400 may be configured to monitor the lateral gap 310*a*, 310*b* between the guide wheels 270*a*, 270*b* and the sidewalls 85*b*, 85*c* of the track beam 86, a speed of the one or both of the guide wheels 270*a*, 270*b* and/or a force of the one or both of the guide wheels 270*a*, 270*b* against the sidewalls 85*b*, 85*c* to show the extent of any contact from movement of the drive wheel 134*a*. In one embodiment the sensor 400 may be configured to monitor lateral motion of the drive wheel 134*a*, rather than the guide wheel 270*a*, relative to the track beam 86.

In one embodiment, a plurality (e.g. two) sensors 400, 400*a* (also referred to as first and second sensors) may be utilized on one side of the vehicle (either a left lateral side or a right lateral side). The sensors 400, 400*a* may be spaced vertically apart from each other, e.g. in a direction that is normal to the lateral direction, along an axis parallel to the direction of travel for the car mover 80*a* (e.g., the vertical axis) in the lane 60. The plurality of sensors provide respective signals representing, e.g., the first and/or second lateral gaps 310*a*, 310*b*. A difference between the two signals to may be utilized by the controller 115 (FIG. 1) to monitor tilt of the car mover 80*a*. The average of sensor data from the plurality of sensors may be utilized to monitor the first and/or second lateral gaps 310*a*, 310*b*.

Based on the sensor measurements, a determination may be made as to whether the track beam 86 is warped in any location. In addition, based on an analysis of the sensor data and motion data of the car mover 80*a*, such as velocity, acceleration, and vibrations or shock, and a determination may be made as to an operational state of the car mover 80*a*. For example, an unbalance in torque applied by a drive motor 132*a* and/or brakes to the drive wheel 134*a* of the car mover 80*a* may result in one or more of the guide wheels 270*a*, 270*b* engaging the respective sidewalls 85*b*, 85*c* of the track beam 86 even though the track beam 86 is true (i.e., not warped).

In alternative embodiments, the guide wheels 270*a*, 270*b* may be mounted to separate brackets 220, 220*a* (otherwise referred to as first and second brackets) for the same wheel 134*a*. In FIG. 10, second bracket 220*a* is shown schematically and wheel 270*c* mounted to it may represent one of the wheels 270*a*, 270*b* or an additional wheel. One bracket may be above or below the other bracket, defining upper and lower brackets, including locations that are above and below the wheel 134*a*. In this embodiment, one of the sensors 400, 400*a* may be mounted to one bracket 220 and the other sensor 400*a* may be mounted to the other bracket 220*a*. In FIG. 10, sensor 400*a*1 is shown schematically and it may represent one of the sensors 400, 400*a*, or an additional sensor utilized for sensing tilt and the gaps 310*a*, 310*b* as indicated.

The sensor 400 may communicate with a controller 115 (FIG. 2) via wired or wireless communication transmission paths, including for example a wireless network 410, as indicated below. In addition, an analysis of the sensor data, e.g., by comparing sensor data in a raw or complied form, with predetermined thresholds, may be performed on board the sensor 400 (e.g., via edge computing), on the controller 115, on a cloud system 420, or utilizing computing power from a combination of these or additional computing devices.

Based on the sensor information, segments of track beam 86 may be repaired, an angulation of the drive wheel 134*a* may be modified, e.g., dynamically or during routine maintenance. In addition, one or more of the wheel motor 132*a* and braking system 137*a* (FIG. 2) may be controlled to provide more or less torque when engaged, and/or the car mover 80*a* may be fixed or repaired as needed. Such action may avoid more costly attention that may otherwise be required.

Figure 11:
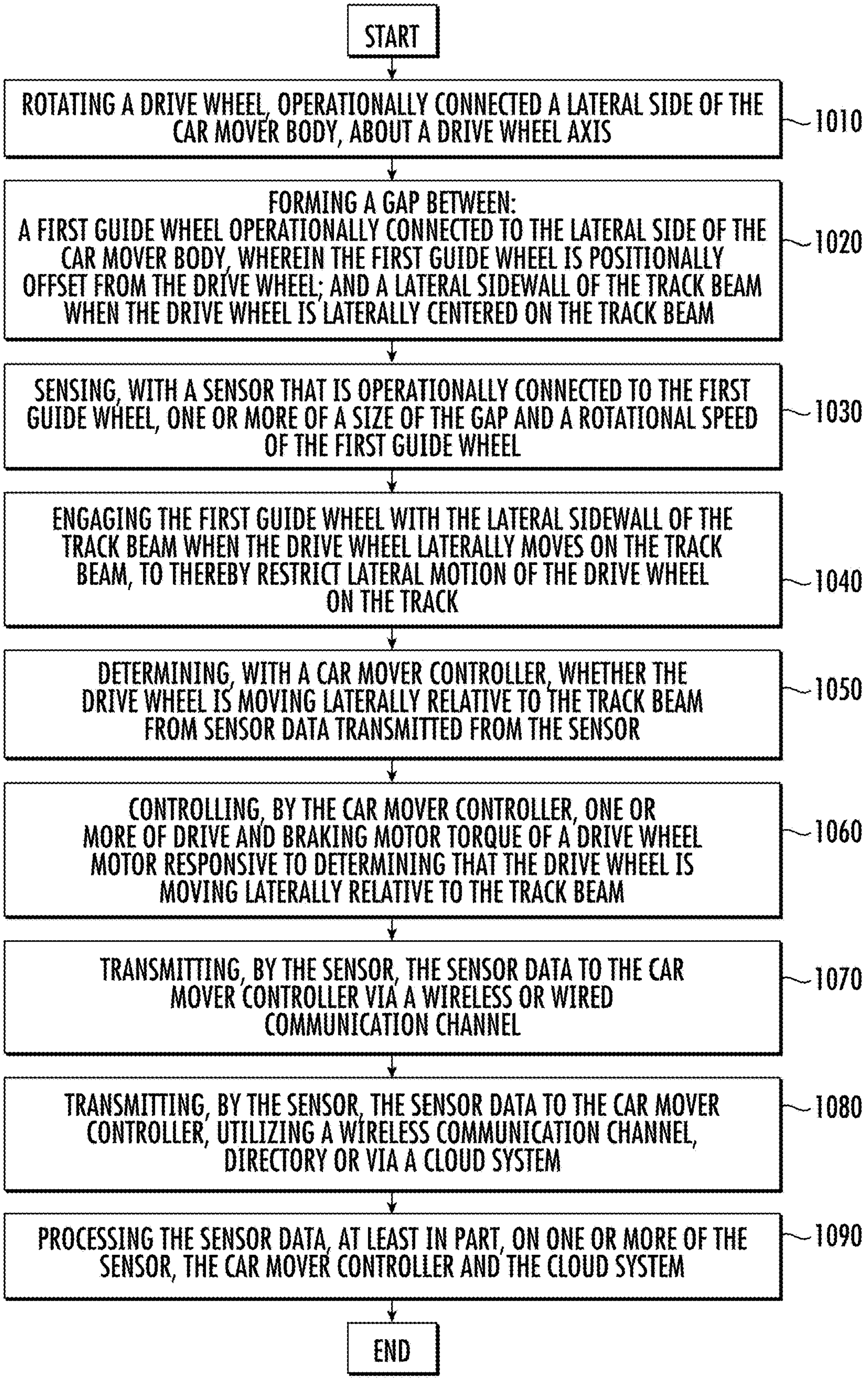
FIG. 11 is a flowchart showing a method of operating a car mover configured for autonomously moving an elevator car along a track beam in a hoistway lane.

Turning to FIG. 11, a flowchart showing a method of operating a car mover 80*a* configured for autonomously moving an elevator car 50*a* along a track beam 86 in a hoistway lane 60 (FIG. 1). As shown in block 1010, the method includes rotating a drive wheel 134*a*, operationally connected to a lateral side of the car mover body 80*a*1, about a drive wheel axis 290.

As shown in block 1025, the method includes sensing, with a sensor 400 that is operationally connected to the car mover 80*a*, one or more of lateral motion of the dive wheel 134*a* on the track beam 86, lateral motion of the first guide wheel 270*a* on the track beam 86, or a rotational speed of the first guide wheel 270*a*. As shown in block 1040, the method includes engaging the first guide wheel with the lateral sidewall of the track beam when the drive wheel laterally moves on the track beam 86, to thereby restrict lateral motion of the drive wheel 134*a* on the track beam 86.

As shown in block 1050, the method includes determining, with a car mover controller 115, whether the drive wheel 134*a* is moving laterally relative to the track beam 86 from sensor data transmitted from the sensor 400. As shown in block 1060, the method includes controlling, by the car mover controller 115, one or more of drive and braking motor torque of a drive wheel motor 137*a* responsive to determining that the drive wheel 134*a* is moving laterally relative to the track beam 86.

As shown in block 1070, the method includes transmitting, by the sensor 400, the sensor data to the car mover controller 115 via a wireless or wired communication channel. As shown in block 1080, the method includes transmitting, by the sensor, the sensor data to the car mover controller 115, utilizing a wireless communication channel, directly or via a cloud system 420. As shown in block 1090, the method includes processing the sensor data, at least in part, on one or more of the sensor 400, the car mover controller 115 and the cloud system 420.

The above disclosed embodiments, providing a backup steering guidance system, prevents contact between the drive wheel 134*a* and the sidewalls 85*b*, 85*c* of the track beam 86, if I-beam shaped, or run off the track beam 86, e.g., if square shaped. The embodiments also provides benefits including: (1) providing a relatively silent operation during normal operation, as the guide wheels 270*a*, 270*b* will normally not be in contact with any surface; and (2) it avoids a need for providing a larger track surface 85*a*, e.g., avoiding a need for a wider track surface 85*a* that would otherwise either installation or material costs. It is to be appreciated, as indicated above, that in some embodiments the guide wheels 270*a*, 270*b* may be in contact with one or more side surfaces defined by the track beam 86.

Wireless connections identified above may apply protocols that include local area network (LAN, or WLAN for wireless LAN) protocols and/or a private area network (PAN) protocols. LAN protocols include WiFi technology, based on the Section 802.11 standards from the Institute of Electrical and Electronics Engineers (IEEE). PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. Such wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). The above is not intended on limiting the scope of applicable wireless technologies.

Wired connections identified above may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A car mover, configured for autonomously moving an elevator car along a longitudinally extending track beam in a hoistway lane, comprising:

a car mover body;

a drive wheel operationally connected to a lateral side of the car mover body, and a drive wheel motor configured to drive the drive wheel to rotate about a drive wheel axis;

a first guide wheel, and a second guide wheel, operationally connected to the lateral side of the car mover body, wherein the first guide wheel is offset from the drive wheel, and the first and second guide wheels are spaced apart from each other, so that, in operation, when the drive wheel is disposed between first and second lateral sidewalls of the track beam:

the first guide wheel engages the first lateral sidewall of the track beam when the drive wheel laterally moves on the track beam, and the second guide wheel is laterally spaced apart from each of the lateral sidewalls of the track beam, to thereby restrict lateral motion of the drive wheel on the track beam, wherein the guide wheels are configured to have respective lateral gaps with the first and second lateral sidewalls of the track beam when the drive wheel is laterally centered on the track beam; and one or more brackets, including a first bracket having a first bracket end connected to the lateral side of the car mover body, and a bracket body extending away from the first bracket end to a second bracket end, wherein the first and second guide wheels are connected to the car mover body via the one or more brackets, wherein the first guide wheel is connected to the first bracket between the first and second bracket ends, wherein in operation, while the drive wheel engages the track beam, one or more of the guide wheels engages the track beam at a location that is longitudinally offset from the drive wheel.

2. The car mover of claim 1, wherein:

the first guide wheel is configured to rotate about a first guide wheel axis that is perpendicular to a drive wheel axis of rotation.

3. The car mover of claim 2, comprising:

a second guide wheel connected to the lateral side of the car mover body, laterally spaced apart from the first guide wheel, wherein the second guide wheel is configured to rotate about a second guide wheel axis that is parallel to the first guide wheel axis.

4. The car mover of claim 3, wherein:

the drive wheel has a drive wheel width; and the first and second guide wheels are laterally spaced apart from each other by a guide wheel separation distance that is greater than the drive wheel width, to thereby engage opposing lateral sides of the track beam.

5. An elevator system including:

a hoistway lane;

a track beam in the hoistway lane;

the car mover of claim 1 configured to move along the track beam and thereby move an elevator car along the hoistway lane.

* * * * *